March 27, 1928.
S. H. PHELPS
CLAMP
Filed April 25, 1927
1,663,728
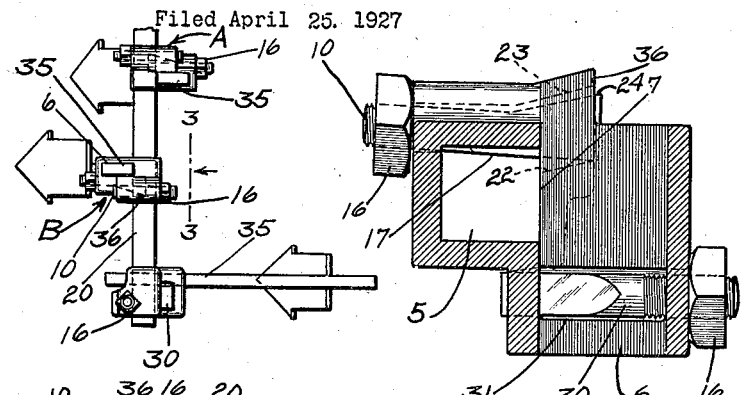
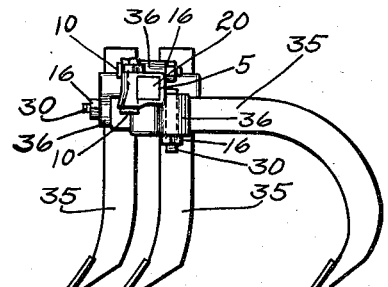
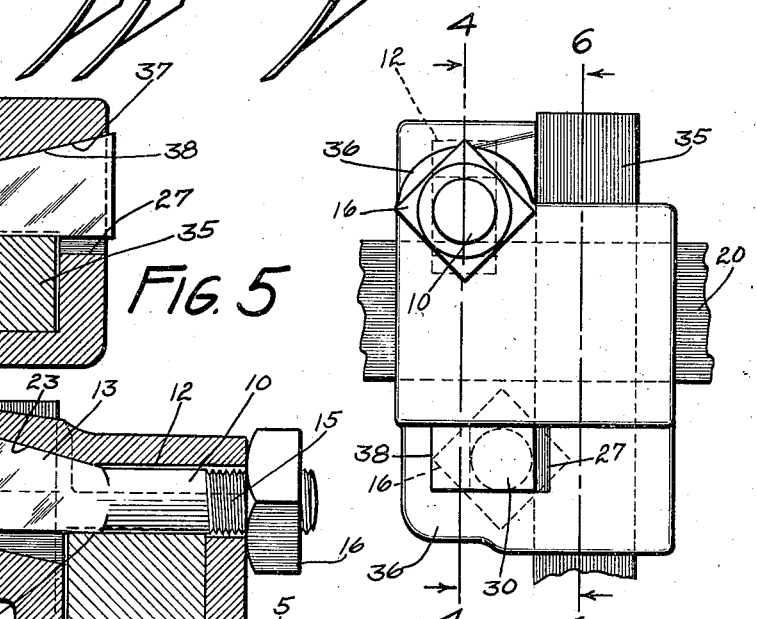
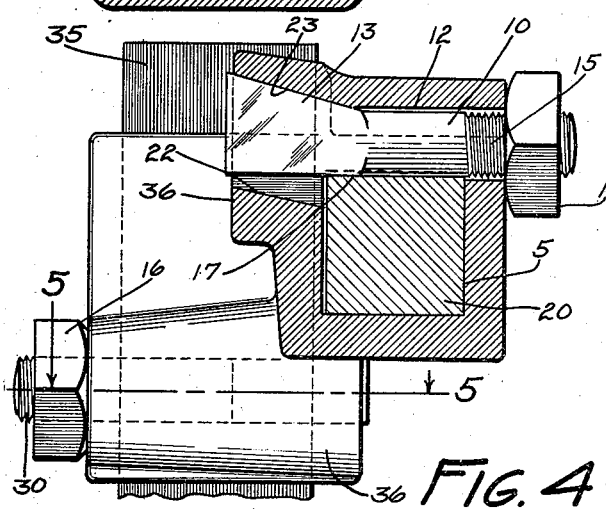
INVENTOR
SPENCER H. PHELPS
By
ATTORNEYS Patented Mar. 27, 1928.

1,663,728

UNITED STATES PATENT OFFICE.

SPENCER H. PHELPS, OF EVANSVILLE, INDIANA, ASSIGNOR TO BLOUNT PLOW WORKS, OF EVANSVILLE, INDIANA, A CORPORATION OF INDIANA.

CLAMP.

Application filed April 25, 1927. Serial No. 186,386.

This invention relates to improvements in clamps and has for a general object to produce a clamp adapted for use for securing cultivator shanks to the horizontal supporting bar of the cultivator. An object of the invention is to provide a clamp element which can be adjusted to assume various radial angular relations with respect to the support to which it is attached. Another object is to provide a clamp so adjustable that the shank can be arranged in a horizontal position above and below the support or in a vertical position at opposite sides of the support. Another object is to provide a block having one square opening and having a second opening at an angle to the first and to provide wedge elements slidable in the block, one for each opening, the said wedges adapted to bindingly engage an element traversing a corresponding opening. Another object is to arrange the wedge elements so that they extend in the same direction, and radial with respect to the support, with the adjusting means so arranged as to always be at the outer side of the element whatever may be its angular relation to the support. Another object is to arrange the slidable wedging or clamping elements laterally of the clamp element to lie in substantially the same plane, which plane is at right angles to the support to which the clamp is attached.

Features of the invention include all of the details of construction of the block, and particularly the arrangement of the parts, for obtaining compactness, and reversibility, as well as accessibility of the clamp-operating means, for all positions of the block.

Objects, features and advantages of the invention will be pointed out in the description of the drawings forming a part of this application and in said drawings:

Figure 1 is a plan view showing the device used for attaching cultivator shanks, the view illustrating three positions which the block or clamp can assume;

Figure 2 is a side elevation or end view of the construction with the clamps angularly related as shown in Figure 1;

Figure 3 is a rear view taken in the direction indicated by the line 3—3 of Figure 1;

Figure 4 is a vertical section on line 4—4 of Figure 3;

Figure 5 is a plan section on line 5—5 of Figure 4; and

Figure 6 is a vertical section on line 6—6 of Figure 3.

The present device has the form of a casting providing an opening 5 and an opening 6, these openings being at angles to one another, in this instance at right angles, with the openings communicating as at 7, within the block, see Figure 6. This arrangement makes for compactness.

Wedge elements are slidable in the block, one is provided for each opening tangent to the opening. The wedge element 10 is arranged laterally of the opening 5, a recess 12 or way, being provided for its reception, see Figure 4. This wedge element has an enlarged terminal portion 13 and a shank portion threaded as at 15 and projecting beyond the outer face of the block. A nut 16 engages the threaded portion and the outer face of the block to draw the element outwardly to clamping position. The clamping surface is indicated at 17 and engages, in this instance, the supporting element 20 as shown. The outline and arrangement of the element 10 is also clearly shown in Figure 6. It will be evident that if the clamping element is drawn to the right as viewed in Figure 4, clamping action will be obtained. A lateral projection 36 has the opening as a continuation of the way 12, for the reception of the head 13 of the clamping element and, this opening provides a slanting surface 23 against which the corresponding inclined surface 24 of the head 13 slides to obtain the clamping action when the bolt is drawn outwardly in an axial direction. A clamp 30 substantially similar to the element 10 is arranged in substantially a similar manner in a recess or way 31 arranged laterally of the opening 6 which receives the shank 35. In both cases the bolts are arranged in passages formed in laterally cast bulging portions 36. The way 31 provides an inclined surface 37, and the element 30 provides the cooperating inclined surface 38. The outer end of the wedge element traverses an opening as an extension of the way 31. Both elements are thus arranged so that they can be easily detached by a lengthwise movement in one direction and they are also arranged so that by an axial movement outwardly in the opposite direction they are moved to clamping position.

It will be noted that the elements are arranged in parallel relation and that they are substantially in the same plane which plane lies laterally of the major portion of the block, and which plane is vertical when the block is attached as shown in Figures 1 and 2. It will be further noted that the nuts 16 lie at the outer face of the block in a position to be easily accessible whatever may be the angular relation of the block to its support. This is clearly shown in Figures 1 and 2 where it will be seen that the adjusting nuts both lie either in a horizontal plane or in a vertical plane respectively laterally of the bar, or above and below the same. Moreover, it will be noted that the block may be reversed so as to arrange the shank opening at one side or the other of a vertical plane passing centrally through the block. Compare arrangements A—B of Figure 1.

The ways 12 and 31, in which the wedge members are translatable, are of sufficient size to permit the wedge members to swing, or move in a direction at right angles to their axes to obtain the proper clamping engagement. These ways extend outwardly and communicate with the rectangular openings which receive the support and the element to be supported, the ways are enlarged respectively as at 22 and 27 in direction of the lateral clamping motion to provide sufficient movement so that the clamps may engage smaller supporting or supported elements.

I claim as my invention:—

1. A block having openings at an angle to one another, and wedge elements slidable in the block, one for each opening and adapted to bindingly engage an element traversing a corresponding opening, said wedge elements extending in the same direction.

2. A block having openings at an angle to one another and wedge elements slidable in the block, one for each opening, and adapted to bindingly engage an element traversing a corresponding opening, said wedge elements extending in the same direction and each having a threaded portion projecting beyond the block and means cooperating with respective projecting portions and with the faces of the block to translate the wedge elements.

3. A block having a square opening and having a second opening of rectangular configuration, the two openings being at angles to one another, wedge elements slidable in the block one for each opening, and adapted to bindingly engage an element traversing an opening, the wedge elements extending in the same direction, and the wedging action taking place as the elements travel outwardly.

4. A block having a square opening and having a second opening of rectangular configuration, the two openings being at angles to one another, wedge elements slidable in the block one for each opening, and adapted to bindingly engage an element traversing an opening, the wedge elements extending in the same direction, and being in substantially the same plane.

5. A block having a square opening and having a second opening of rectangular configuration, the two openings being at angles to one another, wedge elements slidable in the block one for each opening, and adapted to bindingly engage an element traversing an opening, the wedge elements extending in the same direction, and being in substantially the same plane, which plane lies at one side of the block, and at right angles to the square opening.

6. A block having a square opening and having a second opening of rectangular configuration, the two openings being at angles to one another, wedge elements slidable in the block one for each opening, and adapted to bindingly engage an element traversing an opening, the wedge elements extending in the same direction, being in substantially the same plane, and with the wedging action taking place as the elements travel outwardly.

In witness whereof, I have hereunto set my hand this 19th day of April, 1927.

SPENCER H. PHELPS.